United States Patent [19]

Wong et al.

[11] Patent Number: 4,545,997

[45] Date of Patent: Oct. 8, 1985

[54] PROCESS OF MANUFACTURING CANDY BARS CONTAINING WAFERS AND WAFER BARS MANUFACTURED THEREBY

[75] Inventors: Carl Y. Wong, Hummelstown; Mir N. Khan, Palmyra; John A. Mihalik, Hershey, all of Pa.

[73] Assignee: Hershey Foods Corporation, Hershey, Pa.

[21] Appl. No.: 649,166

[22] Filed: Sep. 11, 1984

Related U.S. Application Data

[63] Continuation-in-part of Ser. No. 477,149, Mar. 21, 1983, abandoned.

[51] Int. Cl.$^4$ .................... A21D 13/08; A23G 3/00
[52] U.S. Cl. ........................... 426/94; 426/103; 426/275; 426/283; 426/303; 426/306; 426/660
[58] Field of Search ................ 426/275, 283, 274, 94, 426/103, 303, 306, 660

[56] References Cited

U.S. PATENT DOCUMENTS

| | | | |
|---|---|---|---|
| 1,809,383 | 6/1931 | Heyboer | 426/94 |
| 2,198,726 | 4/1940 | Shwom et al. | 426/306 |
| 2,888,887 | 6/1959 | Wolf | 426/275 |
| 3,670,665 | 6/1972 | Levi | 426/303 |
| 3,814,819 | 6/1974 | Morgan | 426/94 |
| 3,867,559 | 2/1975 | Haas | 426/283 |
| 4,246,290 | 1/1981 | Haas, Sr. et al. | 426/94 |
| 4,275,647 | 6/1981 | Chambers et al. | 426/283 |
| 4,362,751 | 12/1982 | Dogliotti | 426/94 |
| 4,391,832 | 7/1983 | Haas, Sr. et al. | 426/275 |

*Primary Examiner*—Jeanette Hunter
*Attorney, Agent, or Firm*—Paul & Paul

[57] ABSTRACT

A process is disclosed for producing a chocolate coated creamed wafer candy bar, wherein the coating layer does not crack or delaminate during normal storage. Wafer sheets are first baked and their moisture content is substantially increased. A layer of cream having a moisture content less than that of the wafer sheets is applied to the wafer sheets and smaller units of creamed wafers are formed and coated with a paste to produce a candy bar.

13 Claims, 1 Drawing Figure

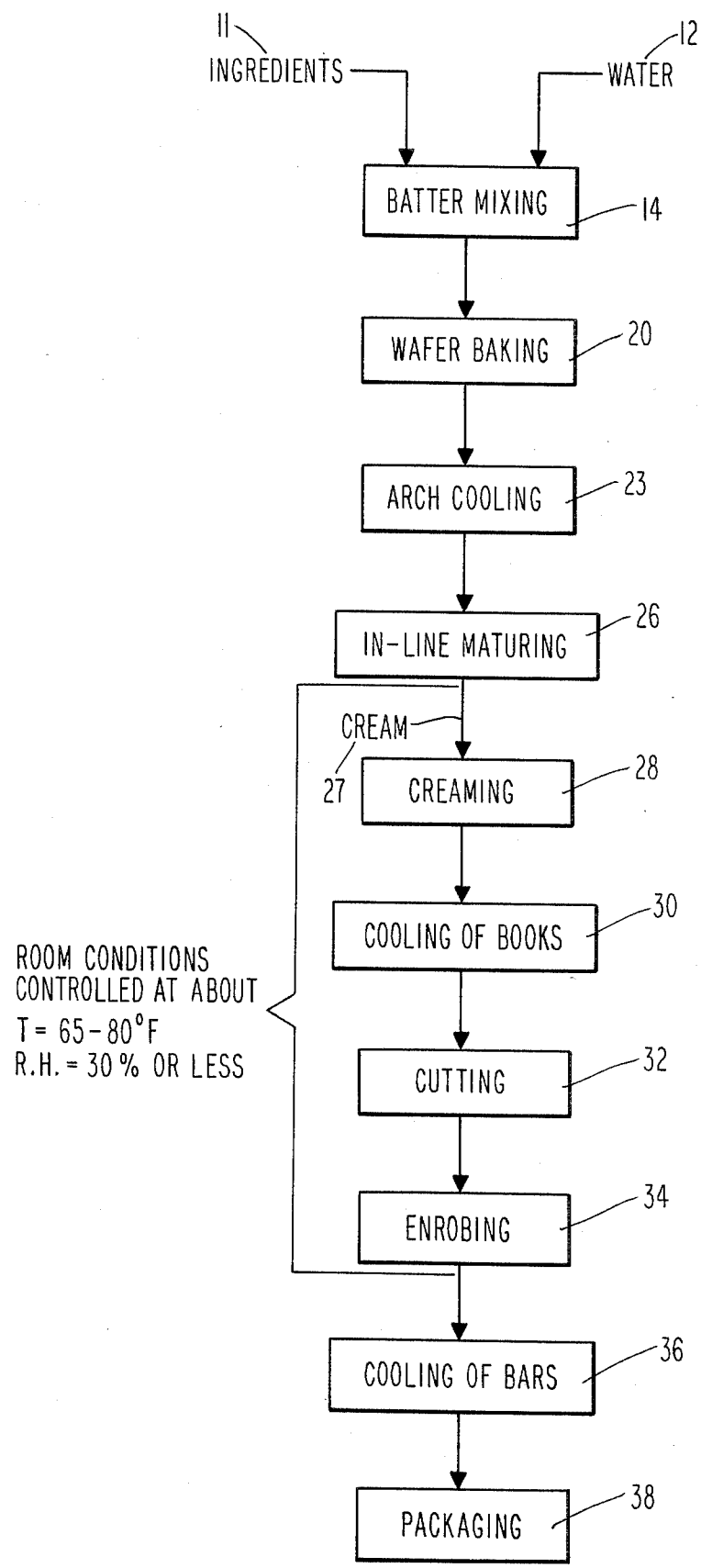

4,545,997

PROCESS OF MANUFACTURING CANDY BARS CONTAINING WAFERS AND WAFER BARS MANUFACTURED THEREBY

This is a continuation-in-part patent application of U.S. patent application Ser. No. 477,149 filed Mar. 21, 1983, now abandoned.

BACKGROUND OF THE INVENTION

1. Field of the Invention

This invention relates to a process for manufacturing candy bars containing baked wafers to which a cream ingredient is applied and in which a stack of creamed wafers is covered by a coating which is protected from cracking or delamination by controlling the moisture contents of the baked wafer and the cream whereby moisture transfer from the cream to the wafer is minimized so that the wafer does not exert delaminating stresses on the exterior coating by expansion of the wafers due to moisture addition thereto. The invention also relates to the product produced by the process.

2. Description of the Prior Art

The process of manufacturing candy bars made up of creamed wafers which are then covered by a final coating, such as chocolate, is complicated because of changes which may occur in the structure of the wafers after the wafers have been covered. In the prior art various attempts have been made to avoid cracking or delamination of the final coating by producing stacks of wafers coated with a suitable cream when the wafers have a relatively low moisture content as they come from the ovens in which they are manufactured. One such process involves the provision of a relatively large, controlled atmosphere room in which the wafer stacks are stored for relatively long periods of time, such as several days, during which the stacks of creamed wafers are moved through the room, commonly referred to as a maturing room. At the end of this period of time the matured stacks are moved out of the maturing room and are fed to a coating machine which covers the matured wafer stacks with a coating which frequently consists of a chocolate mixture. The exact mechanism of such maturing is not precisely known. The time required in the maturing room presents a very real disadvantage since large numbers of such wafer stacks must be held in such maturing rooms for long periods of time, and it is not always easy to determine exactly how long this period of time should be.

One of the ways proposed in the past to avoid these difficulties was to provide a maturing tunnel for the wafers which were then coated with a cream, cut to the appropriate candy bar sizes and then enrobed. However, the prior attempts involving the use of such maturing tunnels were not successful due to the fact that the final candy bar product, after being coated or enrobed, would ultimately undergo cracking and delamination of the final coating if the resulting candy bars were stored for any significant length of time. Significantly, the shorter time provided by the use of such maturing tunnels was more than offset by the shortened shelf life of the final product. The process of the present invention makes possible the elimination of the long holding times involved in the use of the prior art maturing rooms and at the same time avoids the cracking and delamination involved in the use of the maturing tunnels of the prior art.

SUMMARY OF THE INVENTION

A process for producing stacks of creamed wafers and coated creamed wafer candy bars made from such stacks, is disclosed. Wafer sheets and cream are provided wherein the moisture content of the wafers is greater than that of the cream. A cream layer is applied to the wafer sheets in a manner such that the water vapor partial pressure of the cream is maintained below that of the wafers to favor moisture transport from the wafers to the cream. The preferred way of doing this is to treat the wafers to increase their moisture content, which may be accomplished by passing the wafers through an in-line maturing tunnel or moisturizing chamber and then applying the cream layer. It is preferable that the cream layer be prepared and applied in a warm and dry atmosphere, as, for instance, air temperature about 65° F. to about 80° F. and a relative humidity of 30% or less. Wafer-cream stacks, or books made up of a plurality of such creamed wafer sheets, are thus formed. These books are passed through a cooler and are then cut into smaller stack units and then coated or enrobed with a paste. After the coating step, the final enrobed candy bar products are cooled, packaged and shipped to the customer or added to inventory.

OBJECTS OF THE INVENTION

It is therefore an object of this invention to provide a process for producing wafer-cream stacks for use in the manufacture of coated, creamed wafer candy bars in which the coating does not undergo delamination or cracking during normal storage.

It is a further object of the present invention to provide a process for production of wafers that involves in-line maturing of these wafers with substantial increase in moisture content of such wafers during the maturing step.

It is a still further object of the invention to provide a process, and a candy bar produced thereby, for producing a chocolate enrobed wafer creamed candy bar wherein the water contents of the cream and of the wafers are selected so that the resulting partial pressure of the cream water vapor is substantially less than that of the wafer water vapor.

These and other objects of this invention will appear from the following specification, and are not to be construed as limiting the scope of the invention, since, in view of the disclosure herein, others may be able to develop additional embodiments within the scope of the appended claims.

DESCRIPTION OF THE PREFERRED EMBODIMENT

The steps for a process of making a chocolate enrobed creamed wafer candy bar are shown in the attached block diagram. The process begins with a mixing of various batter ingredients 11 with water. This mixing is designated a batter mixing step 14 and starts with mixing sugar and water for 30 seconds. This is done to make sure that the maximum amount of sugar is dissolved in the water. Next, a quantity of sodium bicarbonate, soft wheat flour, refined palm kernal oil and lecithin (a release agent) are added in the proportions shown hereafter in the example. Batter mixing 14 is done by a standard commercial mixer, such as Batter Mixer Type TM 120 made by the Franz Haas Waffelmaschinen Industriegesellschaft mbH, hereinafter Franz Haas Co., in which these ingredients are mixed for an additional 3½ minutes. The batter viscosity should now be about 1500–3000 centipoise as measured by a standard viscosity measuring instrument. The batter temperature should be approximately 75° plus or minus 5° Fahrenheit during the mixing step.

After the batter is thoroughly mixed, a wafer sheet is produced. The batter is delivered into an Automatic Wafer Baking Machine, such as Type SWAK 32G made by the Franz Haas Co. This machine consists of a series of waffle-like plates that are attached to a moving conveyor which carries the plates through a heated oven. For each wafer sheet approximately 145 grams of batter are baked at temperatures between about 325° F. and about 350° F. for about 2 minutes. This gives a wafer sheet thickness of between about 2.2 and about 2.3 millimeters with a weight of 57 to 59 g. The dimensions of these wafer sheets are 445.5 mm long by 317 mm wide. The moisture content of the wafers as they emerge from the oven is from about 1.5% to about 1.8%.

The wafer sheets automatically drop out of their waffle iron-type baking plates to a delivery belt which immediately feeds the sheets to an arch cooler 23 such as the Wafer Sheet Cooler, Type TBK 2.0 manufactured by the Franz Haas Co. The passage of the wafer sheets up and over the arch and down the other side, takes about 5 minutes. The wafer sheets now pass immediately into an in-line maturing tunnel 26 such as the model KT160 made by Franz Haas Co. In step 26, the conditions are carefully controlled at a temperature of about 57° C. and a dew point of about 43° C. At this time the wafer sheet weight is between 59.8 and 61.3 g with a moisture content of between about 3.0% and about 6.0%. The length by width dimension is now 450 mm by 320 mm and the warpage is between 12 to 14 mm. The time the sheets spend in the maturing tunnel is controlled to about 21.5 minutes. On emerging from maturing tunnel 26 the wafers pass immediately into a controlled environment room where the temperature is maintained in the range from about 65° F. to about 80° F. and the relative humidity is maintained at about 30% or less. The controlled environment room is an enclosed area sufficiently large to contain all of the apparatus from the exit from the inline maturing tunnel to the exit to the enrobing apparatus and may include the enrobing apparatus as well.

At this point in the process, the cream 27, for example, a flavored peanut cream, is applied as at step 28. The cream should be prepared and applied in a relatively dry environment (relative humidity below 30%). The wafer sheets receive a cream coating from a Franz Haas Co. Cream Spreading machine, Type FSTM 5. In the case of flavored cream, there is a flavored cream to wafer ratio of about 72:28. The flavored cream temperature is about 81° F. to about 84° F. We have discovered that the ratio of the water content of the wafers to the water content of the cream is of great importance in avoiding subsequent delamination of the final coating. Apparently water ab-sorbed into the wafer book units after they have been finally coated results in expansion forces which put stresses on the final coating which ultimately results in cracking and delamination of the final coating. There are two principal sources of moisture for water absorption into the wafers contained in the enrobed candy bars. First, there is the moisture contained in the ambient air which may pass through the wrapper and through the final coating. Second, there is the moisture contained in the cream. The water vapor partial pressures for the cream and for the wafers are related to the moisture contents of the cream and of the wafers. We have discovered that it is important to keep the cream water vapor partial pressure below the wafer water vapor partial pressure. This is accomplished by keeping the moisture content of the cream below about 2% at the time the wafers are creamed and keeping the moisture content of the wafers above about 3.0% at the time they are creamed. This results in water vapor partial pressures of the cream and wafers being such as to favor moisture transport from the wafers to the cream. After the wafer sheets receive the cream, books or layers of wafer and cream are formed and these books are cooled to a temperature of about 55° F. by passing them through a Franz Haas Co. Wafer Cooling Press Type WK60, as at step 30, for a period of about 20 minutes.

The next step after the cooling is to cut the books into smaller units. The books are cut as at step 32 by a Franz Haas Co. Wafer Cutting Machine, Type AWD-2, into dimensions of 102 mm long by 36 mm wide by 14.5 mm high which produces a weight for each unit of about 26.8 g. After the books have been cut into candy bar size, an enrobing process, such as at step 34, is carried out. In this process, a chocolate paste is spread over each book unit. The book unit to chocolate ratio is about 65:35. The standards for identifying the chocolate used are prescribed by the U.S. Food and Drug Administration as published in 21 C.F.R. 163.111, .123 and .130. This is the end of the time period that the wafers and other ingredients remain in the controlled room conditions, from steps 23 through 34, and a total time of only about 46 minutes has elapsed. Alternatively, the enrobing step may be carried out outside the controlled environment room provided this be done quickly, within a very few minutes after emerging from the room, and provided the moisture contents of the cream and the wafers are carefully controlled as described above. It has been discovered that when these conditions are maintained, the resulting ultimate wafer-cream layered and enrobed candy bar does not become delaminated for long periods of time after the packaging step 38.

The wafer enrobed candy bars are sent on a conveyor to a cooling tunnel as at step 36 that has 3 zones. Zone 1 temperature is about 55° F., Zone 2 temperature is about 55° F., Zone 3 temperature is about 64° F. The enrobed candy bars spend approximately 5 minutes in each zone. Candy bar weight is now about 42.3 g and the dimensions are 106.9 mm long by 40.6 mm wide by 17.2 mm high.

After the bars come out of the cooling tunnels, they are sent to a packaging area and are immediately wrapped and packaged as at step 38. Preferably, a foil wrapper is used in order to further minimize absorption of moisture into the wafers.

EXAMPLE

The specific batter formula used in step 14 to make the wafer batter is as follows:

|  | % |
|---|---|
| 1. soft wheat flour (unenriched) | 30.00 |
| 2. Refined Palm Kernel Oil | 0.25 |
| 3. lecithin (oil) | 1.50 |
| 4. sodium bicarbonate | 0.06 |
|  | 31.81 |

| | % |
|---|---|
| 5. H₂O* | 50 liters |

*Flour/water ratio is adjusted to achieve proper viscosity for processing.

Having described our invention by reference to a preferred form thereof, we submit the following claims. What is claimed is:

1. A process for producing a chocolate enrobed creamed wafer candy bar comprising the steps of:
   a. producing sheets of baked wafers;
   b. cooling said sheets;
   c. passing said cooled sheets through an in-line maturing tunnel in which the conditions are maintained at a temperature and dew point such that the moisture content of said sheets is increased to about 3.5 to about 6.0%;
   d. maintaining a controlled environment room in which the temperature is held in the range from about 65° F. to about 80° F. and the relative humidity is held at or below about 30%;
   e. passing said sheets out of said tunnel and into said controlled environment room;
   f. forming a cream having a moisture content less than about 3.5% and less than the moisture content of said wafers;
   g. applying a cream to said wafer sheets while inside said room and forming stacks of said coated wafer sheets while inside said room;
   h. cutting said stacks into candy-size units; and
   i. applying a chocolate coating to said candy-size units to produce a chocolate creamed wafer candy bar which is resistant to delamination of the chocolate coating.

2. A process for producing a candy bar as in claim 1 wherein said maturing step includes passing said cooled sheets through an in-line maturing tunnel and then immediately passing the wafer sheets into the controlled environment room.

3. A process for producing a candy bar as in claim 2 wherein said process includes the steps of:
   a. applying a layer of cream to said sheets after said sheets emerge from said in-line tunnel and enter said controlled environment room;
   b. forming stacks of wafer sheet layers and cream while within said controlled environment room;
   c. cooling said stacks of wafer sheet and cream layers while within said controlled environment room;
   d. cutting said stacks of wafer sheets and cream layers into smaller units of wafer and cream layers while within said room; and
   e. enrobing said smaller units with a chocolate paste immediately after they have been cut.

4. A process for producing a chocolate enrobed creamed wafer candy bar comprising the steps of:
   a. producing sheets of baked wafers;
   b. cooling said sheets;
   c. maintaining a controlled environment room in which the temperature is in the range from about 65° F. to about 80° F. and the relative humidity is maintained at or below about 30%;
   d. passing said cooled sheets into and through an inline maturing tunnel and immediately into said controlled environment room, said maturing tunnel being maintained at a temperature higher than that of said room under conditions whereby the moisture content of said sheets is increased to about 3.5% to about 6.0%;
   e. coating said wafer sheets with a cream having a moisture content less than that of the wafers, and forming stacks comprising layers of wafer and cream while in said controlled environment room;
   f. cooling said stacks of wafer and cream layers while in said room;
   g. cutting said stacks into substantially smaller units while in said room;
   h. enrobing said smaller units with a chocolate paste;
   i. cooling said enrobed units in a cooling tunnel located outside of said room; and
   j. packaging said enrobed units to preserve the inherent qualities of taste, smell, texture, shape and freshness.

5. A candy bar produced in accordance with the process of claim 1 characterized by resistance to delamination.

6. A candy bar produced in accordance with the process of claim 4 characterized by resistance to delamination.

7. A process for producing a wafer for use in a candy bar comprising the steps of:
   a. making a wafer mixture by mixing predetermined amounts of sugar, water, sodium bicarbonate, soft wheat flour, refined palm kernal oil and lecithin for approximately four minutes;
   b. baking said wafer mixture into wafer sheets of a predetermined size in an oven at a temperature between about 325° F. and about 350° F. for approximately two minutes;
   c. cooling said sheets for approximately five minutes;
   d. maintaining a controlled environment room in which the temperature is maintained in the range from about 65° F. to about 80° F. and the relative humidity is maintained at or below about 30%;
   e. passing said cooled wafer sheets into and through an in-line maturing tunnel and into said room for further processing, said maturing tunnel being maintained at a second temperature lower than that of said room; and
   f. applying a cream layer to said wafer sheets wherein the moisture content of the cream is less than that of the wafers and wherein the water vapor partial pressure of the cream is less than the water vapor partial pressure of the wafers.

8. A wafer produced in accordance with the process of claim 7 characterized by resistance to delamination.

9. A process for producing a coated, creamed wafer candy bar in which the coating is protected from delamination, said creamed wafer bar including at least one layer of cream interspersed between at least two wafer layers comprising the steps of:
   forming a layer of cream between at least two wafer layers wherein the moisture content of the wafer layers exceeds that of the cream layer and then coating the cream-wafer combination to form a coated candy bar.

10. The process of claim 9 further including the steps of forming a wafer sheet, increasing the moisture content of said sheet and applying a cream coating to said sheet wherein the moisture content of the cream is less than that of the wafer sheet.

11. The process of claim 9 wherein the water vapor partial pressure of the cream is less than the water vapor partial pressure of the wafer.

12. The process of claim 9 wherein the wafer sheet and the cream are in an environment at the time the cream is applied to the wafer in which the relative humidity is 30% or less.

13. A coated creamed-wafer candy bar produced by the process of claim 9.

* * * * *